United States Patent
Bookbinder et al.

(10) Patent No.: US 10,151,230 B2
(45) Date of Patent: Dec. 11, 2018

(54) HOUSING, FLUID STREAM TREATMENT ARTICLE, EXHAUST SYSTEM AND METHODS OF MANUFACTURING

(71) Applicant: Corning Incorporated, Corning, NY (US)

(72) Inventors: Dana Craig Bookbinder, Corning, NY (US); Kamjula Pattabhirami Reddy, Corning, NY (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/572,358

(22) PCT Filed: May 4, 2016

(86) PCT No.: PCT/US2016/030665
§ 371 (c)(1),
(2) Date: Nov. 7, 2017

(87) PCT Pub. No.: WO2016/182806
PCT Pub. Date: Nov. 17, 2016

(65) Prior Publication Data
US 2018/0135491 A1    May 17, 2018

Related U.S. Application Data

(60) Provisional application No. 62/158,813, filed on May 8, 2015.

(51) Int. Cl.
*F01N 3/28* (2006.01)
*F01N 3/021* (2006.01)
(Continued)

(52) U.S. Cl.
CPC ............ *F01N 3/2842* (2013.01); *B01J 35/04* (2013.01); *C04B 38/0009* (2013.01);
(Continued)

(58) Field of Classification Search
CPC . F01N 3/10; F01N 3/28; F01N 3/2825; F01N 3/2839
(Continued)

(56) References Cited

U.S. PATENT DOCUMENTS 3,441,381 A    4/1969 Keith et al.
3,441,382 A    4/1969 Keith et al.
(Continued)

FOREIGN PATENT DOCUMENTS

CN    202778756 U    3/2013
DE    10032023 A1    1/2002
(Continued)

OTHER PUBLICATIONS

International Search Report and Written Opinion of the International Searching Authority; PCT/US2016/030665; dated July 7, 2016; 12 Pages; European Patent Office.

*Primary Examiner* — Tom P Duong

(57) ABSTRACT

An exhaust system includes an exhaust gas treatment article having a porous ceramic honeycomb body mounted in a housing. The housing can be a low expansion housing and includes an outer shell having a first coefficient of thermal expansion (CTE) and an inner wall having a second CTE greater than the first CTE configured to hold the honeycomb body over operating temperatures.

19 Claims, 6 Drawing Sheets

(51) Int. Cl.
  *F01N 3/022* (2006.01)
  *B01J 35/04* (2006.01)
  *C04B 38/00* (2006.01)
  *B01D 53/94* (2006.01)

(52) U.S. Cl.
  CPC .......... *F01N 3/0211* (2013.01); *F01N 3/0222* (2013.01); *F01N 3/2875* (2013.01); *F01N 3/2878* (2013.01); *B01D 53/94* (2013.01); *F01N 3/2853* (2013.01); *F01N 2330/06* (2013.01); *F01N 2350/02* (2013.01); *F01N 2350/04* (2013.01); *Y02T 10/20* (2013.01)

(58) Field of Classification Search
  USPC .................................................. 422/179, 180
  See application file for complete search history.

(56) References Cited

U.S. PATENT DOCUMENTS

| | | | |
|---|---|---|---|
| 3,645,092 A | 2/1972 | Tatsutomi et al. | |
| 3,653,205 A | 4/1972 | Tadokoro | |
| 3,801,289 A | 4/1974 | Wiley | |
| 3,817,714 A | 6/1974 | Wiley | |
| 3,841,842 A | 10/1974 | Wiley | |
| 3,852,042 A | 12/1974 | Wagner | |
| 3,854,888 A | 12/1974 | Frietzsche et al. | |
| 3,925,026 A | 12/1975 | Bray et al. | |
| 3,945,803 A | 3/1976 | Musall et al. | |
| 3,947,252 A | 3/1976 | Musall et al. | |
| 3,948,533 A | 4/1976 | Novosad | |
| 3,984,207 A | 10/1976 | Abthoff et al. | |
| 4,004,887 A | 1/1977 | Stormont | |
| 4,004,888 A | 1/1977 | Musall et al. | |
| 4,021,203 A | 5/1977 | Givens et al. | |
| 4,143,117 A | 3/1979 | Gaysert | |
| 4,145,394 A | 3/1979 | Abthoff et al. | |
| 4,161,509 A | 7/1979 | Nowak | |
| 4,163,041 A | 7/1979 | Gaysert | |
| 4,353,873 A | 10/1982 | Noritake et al. | |
| 4,362,700 A | 12/1982 | Hayashi et al. | |
| 4,396,664 A | 8/1983 | Mochida et al. | |
| 4,432,943 A | 2/1984 | Musall et al. | |
| 4,759,110 A | 7/1988 | Rieger et al. | |
| 4,909,994 A * | 3/1990 | Nishizawa ............ F01N 3/2842 422/179 |
| 5,082,479 A | 1/1992 | Miller | |
| 5,106,434 A | 4/1992 | Ishida et al. | |
| 5,468,384 A | 11/1995 | Garcera et al. | |
| 5,597,503 A | 1/1997 | Anderson et al. | |
| 5,599,509 A | 2/1997 | Toyao et al. | |
| 5,866,079 A | 2/1999 | Machida et al. | |
| 6,203,764 B1 | 3/2001 | Benson | |
| 6,274,099 B1 | 8/2001 | Maus et al. | |
| 6,284,332 B1 | 9/2001 | Buettner et al. | |
| 6,338,826 B2 | 1/2002 | Yamada et al. | |
| 6,875,407 B1 | 4/2005 | Biel, Jr. et al. | |
| 6,884,398 B1 | 4/2005 | Biel, Jr. et al. | |
| 7,093,431 B2 | 8/2006 | Balle et al. | |
| 7,255,538 B2 | 8/2007 | Shi | |
| 7,297,174 B2 | 11/2007 | Geise et al. | |
| 7,431,896 B2 | 10/2008 | Biel, Jr. et al. | |
| 7,497,999 B2 | 3/2009 | Ichikawa | |
| 7,559,967 B2 | 7/2009 | Oya et al. | |
| 7,575,726 B2 | 8/2009 | Carroll et al. | |
| 7,611,561 B2 | 11/2009 | Hill, Jr. et al. | |
| 7,821,977 B2 | 10/2010 | Kim et al. | |
| 8,147,763 B2 | 4/2012 | Maus | |
| 8,721,977 B2 | 5/2014 | Wikaryasz et al. | |
| 8,752,290 B2 | 6/2014 | Myers | |
| 9,670,814 B2 | 6/2017 | Sako | |
| 2001/0046457 A1 | 11/2001 | Zidat et al. | |
| 2003/0003031 A1 | 1/2003 | Bruck et al. | |
| 2003/0039595 A1 | 2/2003 | Geise | |
| 2005/0207948 A1 | 9/2005 | Borneby | |
| 2008/0131335 A1 | 6/2008 | Balk et al. | |
| 2008/0241007 A1 | 10/2008 | Hardesty | |

FOREIGN PATENT DOCUMENTS

| | | |
|---|---|---|
| DE | 10035194 A1 | 2/2002 |
| EP | 2746549 B1 | 9/2017 |
| GB | 1436244 A | 5/1976 |
| JP | 2211959 A | 8/1990 |
| JP | 1000337 A | 1/1998 |
| JP | 02888350 B2 | 5/1999 |
| JP | 2002021554 A | 1/2002 |
| JP | 2002227633 A | 8/2002 |
| JP | 2002227640 A | 8/2002 |
| JP | 2005282374 A | 10/2005 |
| JP | 2005282375 A | 10/2005 |
| JP | 2007315246 A | 12/2007 |
| JP | 2008215337 A | 9/2008 |
| JP | 2011149338 A | 8/2011 |
| JP | 2012193726 A | 10/2012 |
| JP | 2014213232 A | 11/2014 |
| WO | 2007146568 A2 | 12/2007 |

* cited by examiner

HOUSING, FLUID STREAM TREATMENT ARTICLE, EXHAUST SYSTEM AND METHODS OF MANUFACTURING

CROSS-REFERENCE TO RELATED APPLICATIONS

This application is a national stage application under 35 U.S.C. § 371 of International Patent Application Serial No. PCT/US2016/030665 filed on May 4, 2016, which claims the benefit of U.S. Provisional Patent Application No. 62/158,813 filed on May 8, 2015, the contents of both are relied upon and incorporated herein by reference in their entireties.

BACKGROUND

Field

Exemplary embodiments of the present disclosure relate to housing, fluid stream treatment articles comprised thereof, exhaust system comprised thereof, and methods of manufacturing the same and, more particularly, to housing having differential coefficients of thermal expansion (CTE) between components, exhaust gas treatment article having a porous ceramic body in the housing, exhaust system having the exhaust gas treatment article, and methods of manufacturing the same.

Discussion of the Background

After-treatment of exhaust gas from internal combustion engines may use catalysts supported on high-surface area substrates and, in the case of diesel engines and some gasoline direct injection engines, a catalyzed or non-catalyzed filter for the removal of carbon soot particles. Porous ceramic flow-through honeycomb substrates and wall-flow honeycomb filters may be used in these applications.

The above information disclosed in this Background section is only for enhancement of understanding of the background of the disclosure and therefore it may contain information that does not form any part of the prior art nor what the prior art may suggest to a person of ordinary skill in the art.

SUMMARY

Exemplary embodiments of the present disclosure provide a fluid treatment article.

Exemplary embodiments of the present disclosure also provide a housing configured to mount a porous ceramic honeycomb body.

Exemplary embodiments of the present disclosure also provide an exhaust system.

Exemplary embodiments of the present disclosure also provide a method of manufacturing an exhaust gas treatment article.

Additional features of the disclosure will be set forth in the description which follows, and in part will be apparent from the description, or may be learned by practice of the disclosure.

An exemplary embodiment discloses a fluid stream treatment article. The fluid stream treatment article includes a porous ceramic honeycomb body and a housing configured to mount the porous ceramic honeycomb body. The porous ceramic honeycomb body has a plurality of channel walls extending axially between opposing first and second end faces defining cell channels there between, and an outer peripheral surface extending axially. The housing includes an outer wall having a first coefficient of thermal expansion (CTE), $\alpha_1$, disposed around the honeycomb body outer peripheral surface to define an inner space containing the honeycomb body, at least one first inner member connected to the outer wall and extending axially in the inner space of the outer wall to the first end face of the honeycomb body, and at least one second inner member disposed on the outer wall in the inner space of the outer wall. The at least one first inner member has a second CTE, $\alpha_2$, greater than the first CTE, the at least one inner member configured to expand more than the outer wall per unit length when the housing is heated to hold the honeycomb body between the at least one first inner member and the at least one second inner member disposed at the second end face at all temperatures in an operating temperature range.

An exemplary embodiment also discloses an article for treating a fluid stream. The article includes a honeycomb body comprising a porous ceramic and having a plurality of channel walls extending axially between opposing first and second end faces and defining cell channels therebetween, and comprising an outer peripheral surface extending axially. The article includes a housing in which the porous ceramic honeycomb body is mounted. The housing includes an outer wall having a first coefficient of thermal expansion (CTE), $\alpha_1$, surrounding the honeycomb body, and first and second inner members disposed on an inner surface of the outer wall and extending radially inward, the first inner member having a second CTE, $\alpha_2$, greater than the first CTE, the first inner member extending axially and having a length L2. The first and second inner members maintain contact with the honeycomb body at all temperatures in an operating temperature range.

An exemplary embodiment also discloses a housing configured to mount a porous ceramic honeycomb body. The housing includes an outer wall having a first coefficient of thermal expansion (CTE), $\alpha_1$, configured to be disposed around the honeycomb body outer peripheral surface to define an inner space containing the honeycomb body, at least one first inner member connected to the outer wall and extending axially in the inner space of the outer wall configured to contact a first end face of the honeycomb body, and at least one second inner member disposed on the outer wall in the inner space of the outer wall configured to contact a second end face of the honeycomb body. The at least one first inner member has a second CTE, $\alpha_2$, greater than the first CTE, the at least one first inner member configured to expand more than the outer wall per unit length when the housing is heated to hold the honeycomb body between the at least one first inner member and the at least one second inner member at all temperatures in an operating temperature range.

An exemplary embodiment also discloses an exhaust system. The exhaust system includes an inlet configured to accept an exhaust gas stream to be purified, an exhaust gas treatment article configured to flow the exhaust gas stream through a honeycomb body to purify the exhaust gas stream, and an outlet configured to emit the purified exhaust gas stream. The exhaust gas treatment article includes the porous ceramic honeycomb body and a low expansion housing configured to mount the porous ceramic honeycomb body. The porous ceramic honeycomb body has a plurality of channel walls extending axially between opposing first and second end faces defining cell channels there between, and an outer peripheral surface extending axially. The housing includes an outer wall having a first coefficient of thermal expansion (CTE), $\alpha_1$, disposed around the honeycomb body outer peripheral surface to define an inner space containing the honeycomb body, at least one inner member connected to the outer wall and extending axially in the inner space of the outer wall to the first end face of the honeycomb body, and at least one second inner member disposed on the outer wall in the inner space of the outer wall. The at least one first inner member has a second CTE, $\alpha_2$, greater than the first CTE, the at least one first inner member configured to expand more than the outer wall per unit length when the low expansion housing is heated to hold the honeycomb body between the at least one first inner member and the at least one second inner member disposed at the second end face at all temperatures in an operating temperature range.

An exemplary embodiment also discloses a method of manufacturing an exhaust gas treatment article. The method includes mounting the honeycomb body in the low expansion housing configured to hold the honeycomb body in an exhaust gas stream. The mounting includes disposing the honeycomb body in an inner space of an outer wall, the outer wall having a first coefficient of thermal expansion (CTE), $\alpha_1$, and attaching at least one first inner member to the outer wall, the first inner member extending axially in the inner space of the outer wall to the first end face of the honeycomb body. The second end face of the honeycomb body is supported on at least one second inner member disposed on the outer wall in the inner space of the outer wall. The at least one first inner member has a second CTE, $\alpha_2$, greater than the first CTE, the at least one first inner member configured to expand more than the outer wall per unit length when the housing is heated to hold the honeycomb body between the at least one first inner member and the at least one second inner member at all temperatures in an operating temperature range.

It is to be understood that both the foregoing general description and the following detailed description are exemplary and explanatory and are intended to provide further explanation of the disclosure.

BRIEF DESCRIPTION OF THE FIGURES

The accompanying drawings, which are included to provide a further understanding of the disclosure and are incorporated in and constitute a part of this specification, illustrate exemplary embodiments of the disclosure, and together with the description serve to explain the principles of the disclosure.

DETAILED DESCRIPTION

Figure 1:
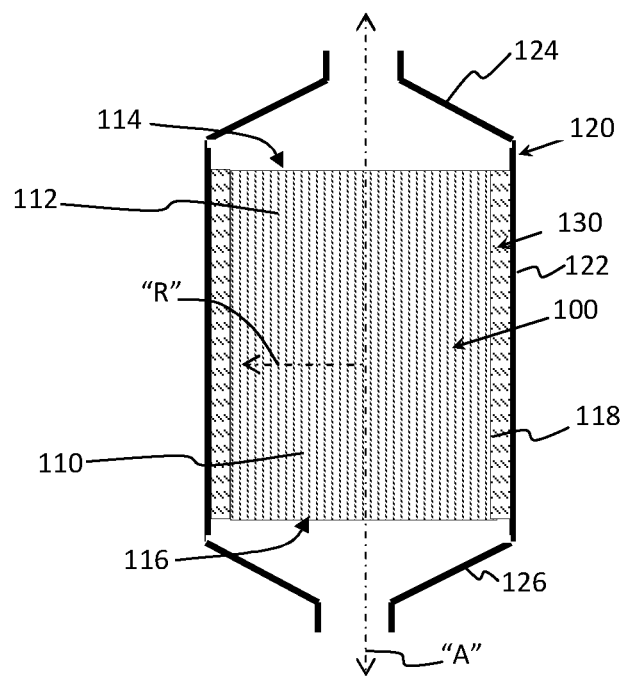
FIG. 1 presents a schematic cross sectional view of a conventional arrangement of a honeycomb body canned with a mat.

The disclosure is described more fully hereinafter with reference to the accompanying drawings, in which exemplary embodiments of the disclosure are shown. This disclosure may, however, be embodied in many different forms and should not be construed as limited to the exemplary embodiments set forth herein. Rather, these embodiments are provided so that this disclosure is thorough, and will fully convey the scope of the disclosure to those skilled in the art. In the drawings, the size and relative sizes of layers and regions may be exaggerated for clarity.

It will be understood that when an element or layer is referred to as being "on", "connected to", or "adjacent to" another element or layer, it can be directly on, directly connected to, or directly adjacent to the other element or layer, or intervening elements or layers may be present. In contrast, when an element or layer is referred to as being "directly on", "directly connected to", or "directly adjacent to" another element or layer, there are no intervening elements or layers present. Like reference numerals in the drawings denote like elements. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

While terms such as, top, bottom, side, upper, lower, vertical, and horizontal are used, the disclosure is not so limited to these exemplary embodiments. Instead, spatially relative terms, such as "top", "bottom", "horizontal", "vertical", "side", "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly. "Alpha" and "α" (Greek letter alpha) can be used interchangeably herein. "Beta" and "β" (Greek letter beta) can be used interchangeably herein as can additional Greek letters and their respective symbols.

"About" modifying, for example, the quantity of an ingredient in a composition, concentrations, volumes, process temperature, process time, yields, flow rates, pressures, viscosities, and like values, and ranges thereof, employed in describing the embodiments of the disclosure, refers to variation in the numerical quantity that can occur, for example: through typical measuring and handling procedures used for preparing materials, compositions, composites, concentrates, or use formulations; through inadvertent error in these procedures; through differences in the manufacture, source, or purity of starting materials or ingredients used to carry out the methods; and like considerations. The term "about" also encompasses amounts that differ due to aging of a composition or formulation with a particular initial concentration or mixture, and amounts that differ due to mixing or processing a composition or formulation with a particular initial concentration or mixture.

In these exemplary embodiments, the disclosed article, and the disclosed method of making the article provide one or more advantageous features or aspects, including for example as discussed below. Features or aspects recited in any of the claims are generally applicable to all facets of the disclosure. Any recited single or multiple feature or aspect in any one claim can be combined or permuted with any other recited feature or aspect in any other claim or claims.

Exemplary embodiments of the disclosure relate to an improved fluid stream treatment article such as exhaust gas treatment article, including a honeycomb body mounted in a metal housing, as well as an economical and efficient method for mounting a honeycomb body in a metal housing. The exhaust gas treatment article may be part of an exhaust gas treatment system to clean exhaust gases.

Auto, truck, motorcycle, other mobile, as well as stationary, catalytic converter honeycomb substrates and diesel filters (honeycomb bodies) can be mounted inside housings (cans). For ease of description, the exemplary embodiments refer to honeycomb body, but the disclosure is not so limited, for example, trough filters and radial flow filters are also included in this disclosure. A fiber mat can be placed around the honeycomb body to minimize the effects of vibration and movement. As the honeycomb body and housing become hot and the metal housing expands in diameter and length, the mat acts as a buffer, taking up the additional space, thus protecting the honeycomb body from movement.

During long-term usage, temperature cycling and vibration can break down the integrity of the mat. Some mats are an expensive component in the exhaust system and can cost a customer almost as much as the honeycomb body. There are also potential problems of the mat decomposing and fibers from the mat plugging downstream parts of the exhaust system. There are also potential problems where an intumescent mat is not able to provide radial compression to the honeycomb body if the mat temperature is low during use thereof. Furthermore, the placement of the mat during canning processes can lead to manufacturing complications and inefficiencies.

The manufacture of porous ceramic honeycomb bodies may be accomplished by the process of plasticizing ceramic powder batch mixtures, extruding the mixtures through honeycomb extrusion dies to form honeycomb extrudate, and cutting, drying, and firing the extrudate to produce ceramic honeycomb bodies of high strength and thermal durability having channels extending axially from a first end face to a second end face. As used herein a ceramic honeycomb body includes ceramic honeycomb monoliths and ceramic segmented honeycomb bodies.

A co-extruded or an after-applied exterior skin may form an outer peripheral surface extending axially from a first end face to a second end face of the ceramic honeycomb bodies. In some embodiments, channels of the honeycomb bodies defined by intersecting walls (webs), whether monolithic or segmented, can be plugged at an inlet face or an outlet face to produce a filter. When some channels are left unplugged a partial filter can be produced. The honeycomb body, whether monolithic or segmented, can be catalyzed to produce a substrate. A non-plugged honeycomb body is generally referred to herein as a substrate. A catalyzed substrate can have an after applied catalyst or comprise an extruded catalyst. Further, filters and partial filters can be catalyzed to provide multi-functionality. The ceramic honeycomb bodies thus produced may be widely used as catalyst supports, as membrane supports, as wall-flow filters, as partial filters, and as combinations thereof for cleaning fluids such as purifying engine exhausts or other fluid streams such as air or gas streams or liquid or water streams.

Ceramic honeycomb body compositions are not particularly limited and can comprise major or minor amounts of cordierite, aluminum-titanate, mullite, β-spodumene, silicon carbide, zeolite and the like, and combinations thereof. As a further example, the ceramic honeycomb body can comprise an extruded catalyst, such as an extruded zeolite or other extruded catalyst material or combinations of materials.

In some embodiments, cell density may be between about 100 and 900 cells per square inch (cpsi). Cell wall thicknesses can range from about 0.025 mm to about 1.5 mm (about 1 to 60 mil). For example, honeycomb body 100 geometries may be 400 cpsi with a wall thickness of about 8 mil (400/8) or with a wall thickness of about 6 mil (400/6). Other geometries include, for example, 100/17, 200/12, 200/19, 270/19, 600/4, 400/4, 600/3, and 900/2, as well as other geometries. As used herein, honeycomb body 100 is intended to include a generally honeycomb structure but is not strictly limited to a square structure. For example, hexagonal, octagonal, triangular, rectangular or any other suitable cell shape may be used. Also, a cross section of the cellular honeycomb body 100 may be circular, but it is not so limited, for example, the cross section may be elliptical, square, rectangular, other shape, or a combination thereof.

Ceramic honeycomb bodies may be disposed in a housing (can), which may be deployed in a fluid treatment system such as an exhaust system. The housing may be referred to as a can, and the process of disposing the ceramic honeycomb body in the can may be referred to as canning.

FIG. 1 shows a schematic cross sectional view of a conventional arrangement of a canned honeycomb body including a mat. The honeycomb body 100 comprises a plurality of intersecting walls 110 that form mutually adjoining cell channels 112 extending axially between opposing end faces 114, 116. The top face 114 refers to the first end face and the bottom face 116 refers to the second end face of the honeycomb body 100 positioned in FIG. 1, otherwise the end faces are not limited by the orientation of the honeycomb body 100. The top face 114 may be an inlet face and the bottom face 116 may be an outlet face of the honeycomb body 100 or the top face 114 may be an outlet face and the bottom face 116 may be an inlet face of the honeycomb body 100. The outer peripheral surface 118 of the honeycomb body 100 extends axially from the first end face 114 to the second end face 116.

The housing (can) 120 includes an axial section 122 covering the outer peripheral surface 118 of the honeycomb body 100 and funnel-shaped first and second cones 124, 126 that may correspond to inlet and outlet of the exhaust gas treatment article. The housing 120 is generally fabricated of metal or other material that is impermeable to gases, and is configured to contain one or more honeycomb bodies 100. For example, the housing can comprise aluminum, carbon steel, stainless steel such as 400-series stainless steel or 300-series stainless steel, titanium alloy, titanium, other metal alloys, and the like. Exhaust gases flow through the honeycomb body 100 in the general axial direction as indicated by arrow "A", including through the channels 112 that may or may not be catalyzed, and in the case of filters, through the channel walls 110. A mat 130 can be placed around the honeycomb body 100 to minimize the effects of vibration and movement.

Figure 2:
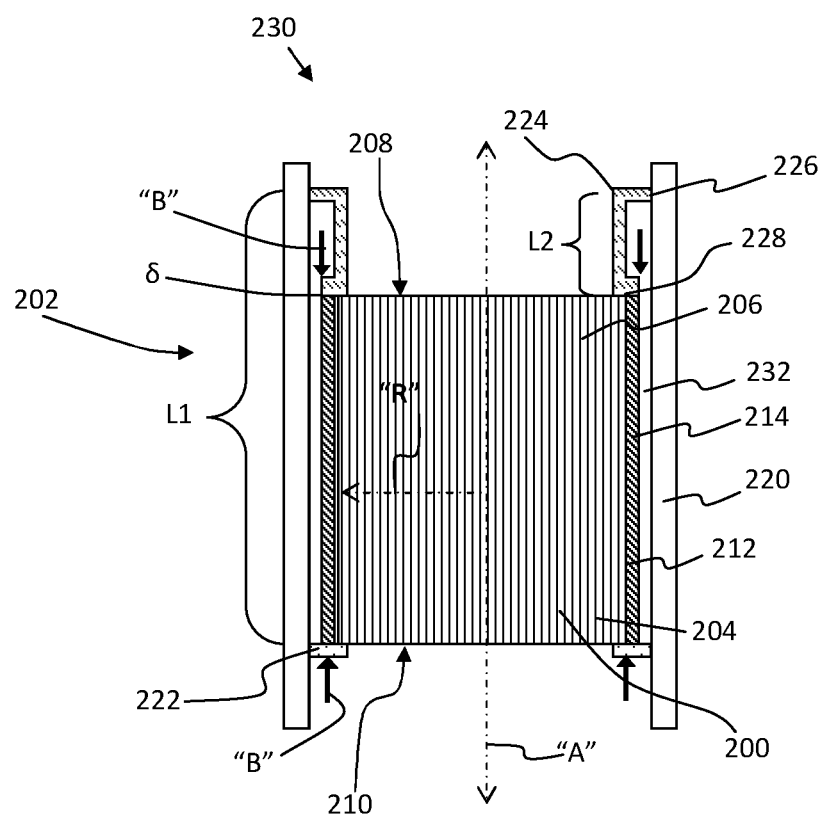
FIG. 2 presents a schematic cross sectional view of a housing having inner and outer components of differential coefficient of thermal expansion (CTE) and a honeycomb body disposed therein forming an exhaust gas treatment article according to an exemplary embodiment of the disclosure.

Exemplary embodiments of the disclosure take advantage of differential coefficients of thermal expansion (CTE) between metals used in the housing. FIG. 2 shows a cross section schematic of a honeycomb body 200 in a low expansion housing 202. The honeycomb body 200 includes a plurality of intersecting walls 204 that form mutually adjoining cell channels 206 extending axially between opposing end faces 208, 210. The outer peripheral surface 212 of the honeycomb body 200 extends axially from the first end face 208 to the second end face 210 and may comprise a ceramic skin 214 disposed thereon. The housing 202 includes an outer wall 220 having a first CTE of $\alpha_1$ and extends in a generally axial direction "A" as shown in FIG. 2. The housing 202 includes an anchor 222 disposed on an inner surface of the outer wall 220 to support the honeycomb body 200 at one of the opposing end faces 208, 210. The anchor 222 may be integrally formed on the inner surface of the outer wall 220 or connected or attached thereto, such as by joining, bonding, welding, adhering, fastening, and the like. The anchor 222 can be, for example, a ring configured to support the second end face 210 outer peripheral region. In this way, the anchor 222 may block outer peripheral cell channels 206 of the honeycomb body 200. Such a blockage prevents gas flow through the blocked cell channels so that the blocked cell channels provide a thermal barrier between the remaining unblocked cell channels and the housing outer wall 220.

According to these exemplary embodiments, the housing 202 includes an inner member 224 having a second CTE of $\alpha_2$ greater than $\alpha_1$ and connected to the outer wall 220 at a housing connection 226 spaced apart from the anchor 222 by an axial distance L1. The inner member 224 is configured to extend axially from the housing connection 226 to the first face 208 of the honeycomb body 200 when the second face 210 is supported on the anchor 222, for example, as shown in FIG. 2. A contact end 228 of the inner member 224 is configured to contact the first face 208. The inner member 224 extends axially from the housing connection 226 to the first face 208 a distance L2. Notably, the inner member 224 is connected to the outer wall 220 only at the housing connection 226 spaced a distance L2 from the contact end 228 configured to contact the first face 208. For example, in one embodiment the lengths $L_1$ and $L_2$ are chosen such that $L1 \times \alpha_1 = L2 \times \alpha_2$. Thus, the housing 202 is configured to firmly secure (mount) the honeycomb body 200 between the anchor 222 and the inner member contact end 228. The low expansion housing 202 having the honeycomb body 200 mounted therein as disclosed forms an exhaust gas treatment article 230, or other fluid treatment article.

According to these exemplary embodiments, the housing 202 components, including such members as the outer wall 220, inner member 224, and anchor 222 can include a metal material, such as at least about 50% by volume of metal material, such as at least about 99% by volume of metal material, such as consisting essentially entirely of metal material. In some embodiments, the material of the housing 202 components is or includes a ferrous metal. In some embodiments, the material of the housing 202 components is or includes steel, such as stainless steel, such as 409 or 410 stainless steel, or 304, 310 or 316 stainless steel having a coefficient of expansion between 25° C. to 300° C. of about 80 to about 200×10$^{-7}$ cm/cm/° C. In some embodiments, the material of the housing 202 components is or includes low expansion metal alloys such as stainless steel, such as Alloy 42 and Alloy 52 alloys having a coefficient of expansion between 25° C. to 300° C. of about 40 to about 100×10$^{-7}$ cm/cm/° C. In some embodiments, the material of the housing 202 components is or includes very low expansion metal alloys such as stainless steel, such as Invar® or Kovar® alloys having a coefficient of expansion between 25° C. to 300° C. of about 40 to about 55×10$^{-7}$ cm/cm/° C. In some embodiments, the metal material is from a metal sheet, rolled to form the housing 202 components, that has a thickness of at least 0.5 mm, such as at least 1 mm, such as at least 1.2 mm, and/or no more than 1 cm, such as no more than 5 mm. In other embodiments the housing 202 components is or includes aluminum. In still other embodiments, material of the housing 202 components is non-metal. In some embodiments, the material of the housing 202 components has a thermal expansion coefficient of at least 70×10$^{-7}$ cm/cm/° C., such as at least 80×10$^{-7}$ cm/cm/° C., such as at least 100×10$^{-7}$ cm/cm/° C., and/or no more than 50×10$^{-5}$ cm/cm/° C.

The honeycomb body can have a CTE, for example, less than or equal to about 45×10$^{-7}$ cm/cm/° C. For example, the honeycomb body CTE can be between about 45 and −10×10$^{-7}$ cm/cm/° C. over the temperature range from 25° C. to 800° C.

In these exemplary embodiments the operating temperature range of the housing is not particularly limited and can be from about −60° C. to about 1500° C. For example, the operating temperature range of the housing can be from about −40° C. to about 1000° C. For example, for exhaust gas applications the operating temperature range of the housing may be from about −40° C. to about 800° C. For example, for other fluid cleaning applications the operating temperature range of the housing may be from about 0° C. to about 500° C., or even about 20° C. to about 300° C.

In the following description and exemplary embodiments, the outer wall 220 is referred to as Metal-1 and the inner member 224 is referred to as Metal-2.

In exemplary embodiments, for a specified Metal-1 housing length of $L_1$ having CTE of $\alpha_1$, the minimum length, $L_2$, for the Metal-2 housing and maximum length of the substrate (honeycomb body), $L_S$, to ensure contact between the Metal-2 housing and substrate at all temperatures as the assembly is heated from 25° C. for the case of initial contact between the substrate and the Metal-2 housing at 25° C. is given by Eqs. [1]-[2]:

$$L_2 \geq \frac{L_1(\alpha_1 - \alpha_s)}{(\alpha_2 - \alpha_s)} \quad [1]$$

$$L_s \leq \frac{L_1(\alpha_2 - \alpha_1)}{(\alpha_2 - \alpha_s)} \quad [2]$$

Where $\alpha_1$, $\alpha_2$, and as are the coefficient of thermal expansions of Metal-1 housing, Metal-2 housing, and ceramic substrate, respectively. Similarly, for a substrate with given length, $L_S$, the minimum length for the Metal-1 and Metal-2 housing is calculated using Eqs. [3] and [4]:

$$L_2 \geq \frac{L_s(\alpha_1 - \alpha_s)}{(\alpha_2 - \alpha_1)} \quad [3]$$

$$L_1 \geq \frac{L_s(\alpha_2 - \alpha_s)}{(\alpha_2 - \alpha_1)} \quad [4]$$

For a general case, the compressive thermal stress in the Metal-2 housing may be calculated using Eq. [5] as:

$$\sigma_{M-2} = \text{Max}\left[\frac{E_2}{(1-v_2)}(L_2(1+\alpha_2\Delta T)+L_s(1+\alpha_s\Delta T)-L_1(1+\alpha_1\Delta T)), 0\right] \quad [5]$$

Where Max is the operation function representing maximum of the two parameters inside the square brackets, $E_2$ is the Young's Modulus of Metal-2 and $v_2$ is the Poisson ratio of Metal-2. In some other embodiments, additional external compressive stress is applied to the substrate where the total compressive stress on the substrate is the sum of the compressive thermal stress from Eq. 5 and the additional external applied stress when the substrate is canned.

In some of these exemplary embodiments, there can be an axial gap δ between the honeycomb body 200 and inner member 224 in the housing 202 and is given by Eq. [6]:

$$\delta = L_1 - L_2 - L_s \quad [6]$$

In some of these exemplary embodiments, the axial gap δ is 0<δ≤about 500 microns. For example, the axial gap δ can be 0<δ≤about 100 microns. That is, for example, the axial gap δ refers to a space between inner member 224 contact end 228 and a corresponding end face 208, 210 of the honeycomb body 200. For example, in FIG. 2, a location of axial gap δ is indicated, although it is 0 microns as illustrated. Similarly, the axial gap δ may be between the second end face 210 and the anchor 222 or a first portion of the axial gap δ may be between inner member 224 contact end 228 and the first end face 208 of the honeycomb body 200 and a second portion of the axial gap δ may be between the second end face 210 and the anchor 222.

The inner member 224 may be a wall, tube, pipe, sleeve, or other ring structure, but need not be so limited. That is, the inner member 224 can be an arm or more than one arm, a rod or more than one rod, a beam or more than one beam, and the like, attached to the outer wall 220 at the housing connection 226 and extending an axial distance L2 to contact the honeycomb body 200. The anchor 222 can be a ring, a tab, a bump on the inner surface of the outer wall 220, an indentation of the outer wall 220, or the like, and a combination thereof. The outer wall 220 can be a tube, pipe, shell, sleeve, or vessel structure, but need not be so limited. The outer wall 220 can be a tube, pipe, shell, sleeve, or vessel structure that is impermeable to gases as the inner member 224 can be, as well.

The housing 202 having the honeycomb body 200 mounted therein as disclosed can be heated to service temperatures, for example, over 100° C., over 200° C., over 600° C., up to 800° C., or even up to 1000° C. while holding the honeycomb body 200 tightly between the anchor 222 and the contact end 228 of the inner member 224. That is, on heating, as the outer wall 220 having the first CTE of $\alpha_1$ expands, the inner member 224 having the second CTE of $\alpha_2$ will expand more per unit length. Thus, the inner member contact end 228 will continue to press the first end face 208 of the honeycomb body 200 firmly holding the second end face 210 against the anchor 222 thereby holding the honeycomb body 200 between the anchor 222 and the inner member contact end 228 at all temperatures.

As a further illustration not intended to be limiting, the outer wall 220 can be made of 409 stainless steel having a CTE of α1 equal to about 12.3×10⁻⁵ cm/cm/° C., an end ring configured as the anchor 222 can be welded to the inside surface of the outer wall 220 to contact the honeycomb body 200, for example, at the second end face 210, and a "high" expansion inner member 224, such as a liner tube, sleeve, pipe, or rod(s), for example, 304 stainless steel, having a CTE $\alpha_2$ equal to about 18.1×10⁻⁶ cm/cm/° C. can be placed in axial contact with the honeycomb body 200, for example, a proximate end abutting the first end face 208, then a distal end welded on the inside of the outer 409SS housing at the housing connection 226 on the opposite side of the honeycomb body 200 from the anchor 222 as shown in FIG. 2. Thus the outer wall 220 and inner member 224 are free to move independently of each other (with respect to the position of the weld at the housing connection 226). As the housing 202 is heated during operation, it grows in diameter and length. The "high" expansion liner (inner member 224) expands at a higher rate than the housing outer wall 220 and remains in firm and continuous contact with the honeycomb body 200 that remains in firm and continuous contact with the housing outer wall 220 at the end ring anchor 222, preventing the honeycomb body 200 movement and subsequent vibration damage. In effect, the housing 202 comprises a bi-metallic mounting system. It is to be noted that the contact of the housing 202 with the honeycomb body 200 between the contact end 228 and anchor 222 is in the highest strength axial direction for the honeycomb body 200, that is, in the axial direction "A". The housing 202 can exert an axial compressive force "B" on the honeycomb body 200 between the contact end 228 and anchor 222 to firmly hold the honeycomb body 200 during heating and cooling.

In these exemplary embodiments, the honeycomb body 200 can be disposed between the contact end 228 and the anchor 222 having the outer periphery 212 spaced apart from the inner surface of the outer wall 220 providing a gap 232. The gap 232 can be empty or filled with a mat, insulation, or the like and combinations thereof. Alternatively, the honeycomb body 200 can be disposed between the contact end 228 and the anchor 222 having the outer periphery 212 directly in contact with the inner surface of the outer wall 220. Further, the outer periphery 212 can be directly in contact with the inner surface of the outer wall 220 on some portions and in other portions a gap 232 may space the outer periphery 212 from the inner surface of the outer wall 220.

According to these exemplary embodiments, the housing 202 can be configured to mount a honeycomb body 200 by combining a first inner member 224 at the first end face 208 with a second inner member (not shown) in place of the anchor 222 at the second end face 210. Here, the second inner member can be disposed on the outer wall 220 as described for the inner member 224, but at the second end face 210 and in the opposing direction.

Figure 3:
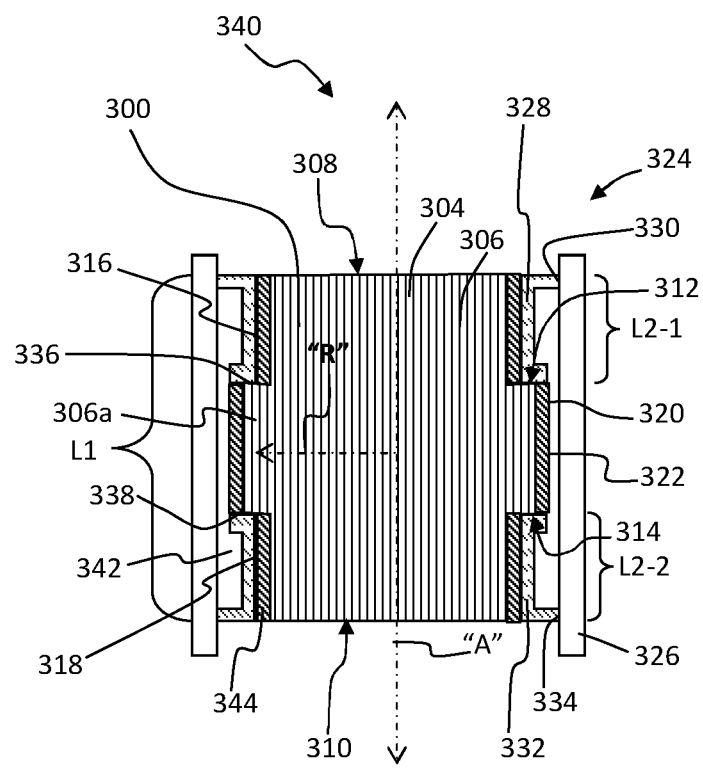
FIG. 3 presents a schematic cross sectional view of a housing having inner and outer components of differential CTE and a honeycomb body disposed therein forming an exhaust gas treatment article according to another exemplary embodiment of the disclosure.

FIG. 3 presents a schematic cross sectional view of a housing having inner and outer components of differential CTE and a canned honeycomb body disposed therein forming an exhaust gas treatment article according to another exemplary embodiment of the disclosure. The honeycomb body 300 can be the same as the honeycomb body 200 described with reference to FIG. 2 having a plurality of intersecting walls 304 that form mutually adjoining cell channels 306 extending axially between opposing end faces 308, 310.

The first end face 308 may have a first recessed end face 312 at a periphery of the honeycomb body 300 spaced axially in a direction "A" from the first end face 308. The second end face 310 may have a second recessed end face 314 at a periphery of the honeycomb body 300 spaced axially in a direction opposing direction "A" from the second end face 310. A first outer peripheral surface 316 of the honeycomb body 300 extends from the first end face 308 to the first recessed end face 312. A second outer peripheral surface 318 of the honeycomb body 300 extends from the second end face 310 to the second recessed end face 314. A third outer peripheral surface 320 of the honeycomb body 300 extends from the first recessed end face 312 to the second recessed end face 314. The third outer peripheral surface 320 together with the first recessed end face 312 and the second recessed end face 314 define a bump out 322 of the honeycomb body 300.

Alternately, a band (not shown) can be disposed on an outer peripheral surface, such as outer peripheral surface 212 of honeycomb body 200 to provide the first recessed end face 312 and the second recessed end face 314 at upper and lower edges of the band, respectively. The band or the bump out 322 can extend along a portion of the outer peripheral surface 212. Such a band, for example, can be a metal band shrink fit to the honeycomb body 200 so that it exerts a firm radial contact force in direction "R" to the honeycomb body throughout temperature cycles that may be seen in operation of the honeycomb body 300 and band.

According to these exemplary embodiments, the housing 324 includes an outer wall 326 having a first CTE of $\alpha_1$ and extends in a generally axial direction "A" as shown in FIG. 3. The housing 324 includes a first inner member 328 having a second CTE of $\alpha_{21}$ greater than $\alpha_1$ and connected to the outer wall 326 at a first housing connection 330. The first inner member 328 is configured to extend axially from the first housing connection 330 a distance L21 to the first recessed end face 312. The housing 324 includes a second inner member 332 having a third CTE of $\alpha_{22}$ greater than $\alpha_1$ and connected to the outer wall 326 at a second housing connection 334. The second housing connection 334 is spaced a distance L1 from the first housing connection 330. The second inner member 332 is configured to extend axially from the second housing connection 334 a distance L22 to the second recessed end face 314.

The second CTE may be the same as the third CTE or they may be different from each other. Likewise, L21 and L22 may be the same distance or they may be different from each other.

The first and second inner members 328, 332 may be tube, pipe, sleeve, one or more rods, and the like. The first inner member 328 has a proximate first contact end 336 configured to abut the first recessed end face 312 and a distal end attached to the outer wall 326 at the first housing connection 330. The second inner member 332 has a proximate second contact end 338 configured to abut the second recessed end face 314 and a distal end attached to the outer wall 326 at the second housing connection 334. The first housing connection 330 can be at the first end face 308 or spaced axially away from the first end face 308. The second housing connection 334 can be at the second end face 310 or spaced axially away from the first end face 310.

The low expansion housing 324 having the honeycomb body 300 mounted therein forming an exhaust gas treatment article 340 as disclosed can be heated to service temperatures, for example, over 100° C., over 200° C., over 600° C., up to 800° C., or even up to 1000° C. while holding the honeycomb body 300 tightly between the first contact end 336 of the first inner member 328 and the second contact end 338 of the second inner member 332. That is, on heating, as the outer wall 326 having the first CTE of $\alpha_1$ expands, the first and second inner members 328, 332 having the second and third CTE of $\alpha_{21}$, $\alpha_{22}$ will expand more per unit length. Thus, the inner member contact ends 336, 338 will continue to press the first and second recessed end faces 312, 314 of the honeycomb body 300 firmly thereby holding the honeycomb body 200 between the inner member contact ends 336, 338 at all temperatures even as the distance between the first and second housing connections 330, 334 increases.

For example, this can be described by $L1 \times \alpha_1 = L21 \times \alpha_{21} + L22 \times \alpha_{22}$. When $\alpha_{21}$ and $\alpha_{22}$ are equal, for example, then the equation becomes $L1 \times \alpha_1 = (L21 + L22) \times \alpha_{21}$, and further, when L21 and L22 are equal as well, $L1 \times \alpha_1 = 2 (L21) \times \alpha_{21}$ as shown in FIG. 3.

A portion of the channels 306a in the bump out 322 encompasses, for example, surrounds the bulk of the channels 306 in the honeycomb body 300 at the outer periphery of the honeycomb body 300 and may be blocked by the contact ends of the first and second inner members 336, 338. These blocked channels 306a can act as insulation against heat loss during start-up conditions. Together with the gap 342 and any insulation disposed in the gap 342, these blocked channels 306a can help retain heat in the bulk of the honeycomb body 300 to lead to rapid catalyst light-off to minimize start-up emissions from a cold catalyst.

According to these exemplary embodiments, the housing 324 can be configured to mount a honeycomb body 300 having one recessed end face 308 and one non-recessed end face 210 by combining a first inner member 328 as described with reference to FIG. 3 on the recessed end face with an anchor 222 or a second inner member on the non-recessed end face 210 as described with reference to inner member 224 on end face 208 in FIG. 2.

Figure 4:
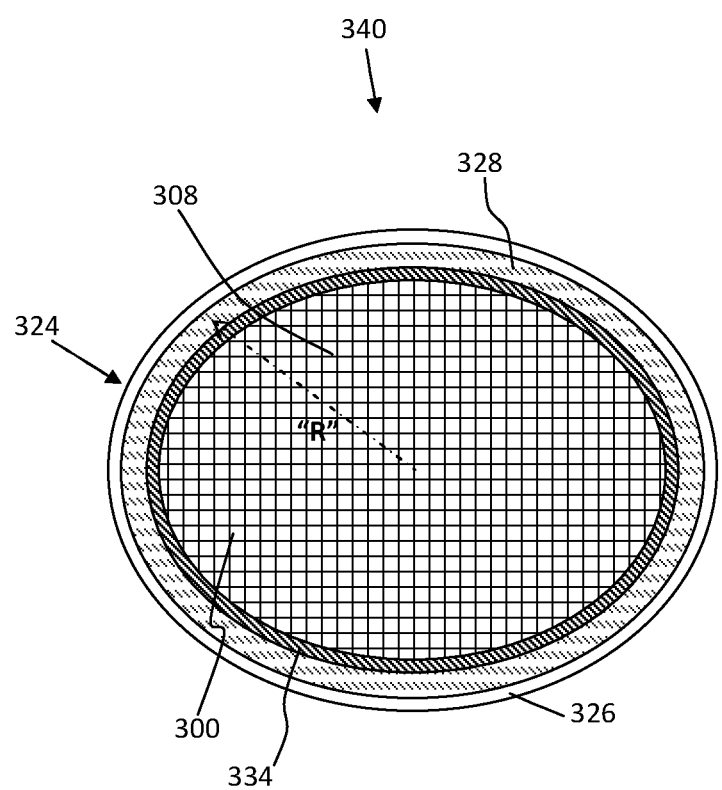
FIG. 4 presents a schematic end view of the housing having inner and outer components of differential CTE and a honeycomb body disposed therein forming an exhaust gas treatment article of FIG. 3.

FIG. 4 presents a schematic end view of the housing having inner and outer components of differential CTE and a honeycomb body disposed therein forming the exhaust gas treatment article of FIG. 3. The honeycomb body 300 may have a skin 344 disposed on the first, second, and third outer peripheral surfaces 316, 318, 320.

Figure 5:
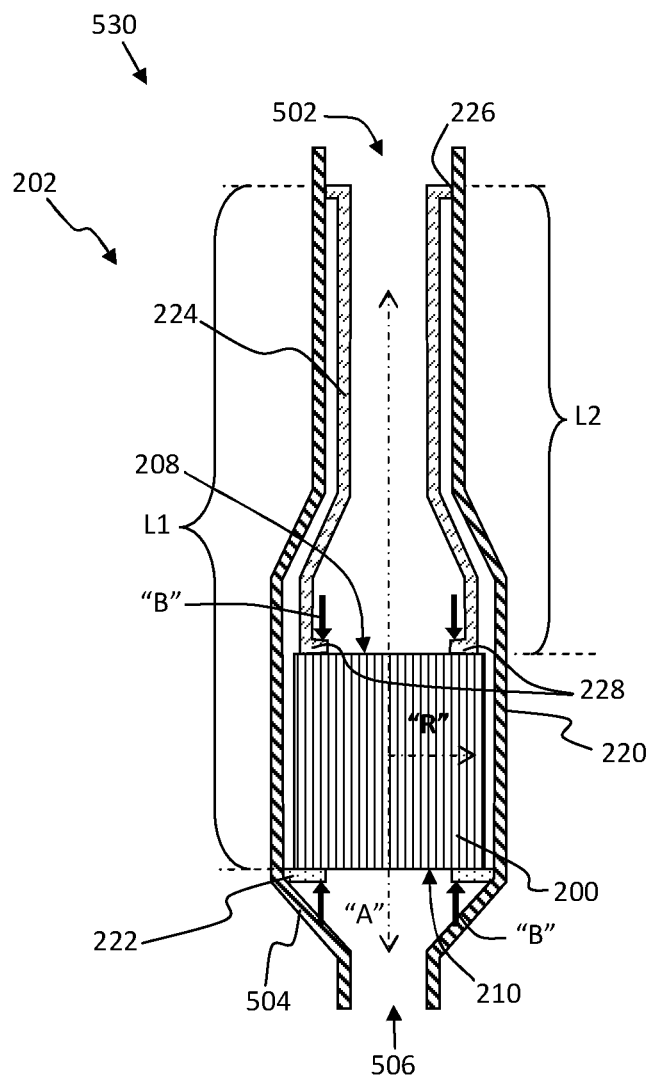
FIG. 5 presents a schematic cross sectional view of a housing having inner and outer components of differential CTE and a honeycomb body disposed therein forming an exhaust gas treatment article according to another exemplary embodiment of the disclosure.

FIG. 5 presents a schematic cross sectional view of a housing having inner and outer components of differential CTE and a honeycomb body disposed therein forming an exhaust gas treatment article according to another exemplary embodiment of the disclosure. The exemplary embodiment shown in FIG. 5 is similar to the exemplary embodiment described above with reference to FIG. 2, but with longer illustrated inner and outer walls 224, 220 comprising bends, that can be, for example, funnel-shaped cones, and shaped walls as may facilitate exhaust gas flow or design in an engine exhaust gas treatment system.

In FIG. 5, exhaust gas may enter an inlet 502 of the differential CTE dual metal housing assembly 202, flow along inner surface of inner member 224, heating the inner and outer walls 224, 220 of the housing 202 causing the inner member 224 to expand more than the outer wall 220. The inner member will exert a force to the first end face 208 of the honeycomb body 200 along axial direction "A" and the anchor 222 will exert an opposing force at the second end face 210 resulting in compressive force "B" on honeycomb body 200 at all temperatures.

The exhaust gas may be purified on passing through the honeycomb body 200 and exit the honeycomb body 200 at the second end face 210, pass through a funnel-shaped cone 504 and exit an outlet 506 of the exhaust gas treatment article 530. The exhaust gas may then pass through other components of an exhaust system, such as a muffler, tail pipe, and the like or the exhaust gas may exit the exhaust system at the outlet 506.

The exhaust gas may be blocked from passing through a portion of the channels 206a that encompasses the bulk of the channels 206 in the honeycomb body 200. The inner member contact end 228 and the anchor 222 may block the exhaust gas from this portion of the channels 206a at the outer periphery of the honeycomb body 200. The blocked channels 206a can act as insulation against heat loss during start-up conditions. Together with the gap 232 and any insulation disposed in the gap 232, these blocked channels 206a can help retain heat in the bulk of the honeycomb body 200 to lead to rapid catalyst light-off to minimize start-up emissions from a cold catalyst.

According to these exemplary embodiments, the exhaust gas treatment article can be assembled, for example, by welding the anchor 222 or the second inner member 332 to the inner surface of the outer wall 220, 326. The honeycomb body 200, 300 can be disposed in the outer wall 220, 326 having the second end face 210 or the second recessed end face 314 disposed on the anchor 222 or the second inner member 332 contact end 338. The inner member 224 or the first inner member 328 can be welded to the outer wall 220, 326 having the contact end 228 or the first contact end 336 disposed on the first end face 208 or the first recessed end face 312 to impart a compressive axial force "B" to the honeycomb body 200, 300 forming the exhaust gas treatment article 230, 340. Also, one or more honeycomb bodies may be positioned axially and held in the housing 202, 324. Furthermore, in these exemplary embodiments, the one or more honeycomb bodies disposed in the housing can be disposed in a second housing and the second housing adapted to an exhaust gas system to flow exhaust gas through the honeycomb body.

In these exemplary embodiments, a mat may be disposed between the housing and the honeycomb body. Alternatively, in these exemplary embodiments, there may be no mat disposed between the housing and the honeycomb body.

According to these exemplary embodiments of the differential CTE dual metal housings of the exhaust gas treatment articles as described herein can exert an axial compression force of >200 psi at 25° C. and <100 psi at 200° C. and above on the honeycomb body 200, 300 mounted inside of the differential CTE dual metal housings 202, 324. For example, the differential CTE dual metal housings 202, 324 can exert an axial compression force of >200 psi at 25° C. and <100 psi at 400° C. and above on the honeycomb body 200, 300. The differential CTE dual metal housings 202, 324 can exert an axial compression force of >200 psi at 25° C. and <100 psi at 600° C. on the honeycomb body 200, 300.

While exemplary embodiments of the disclosure have been described with relation to a honeycomb body, this disclosure is not so limited. That is, trough filters and radial flow filters may also be canned in a similar manner as described herein to form the exhaust gas treatment article.

EXAMPLES

Exemplary embodiments of the disclosure are further described below with respect to certain exemplary and specific embodiments thereof, which are illustrative only and not intended to be limiting.

Modeled examples are shown in Table 1. Described in Table 1 are the ceramic honeycomb material, CTE, Young's Modulus, Poisson's ratio, cell geometry in cells per square inch and cell wall thickness in mils (0.001 inches), length in cm. Modeled examples had diameters for the ceramic honeycomb (honeycomb body) of 14 cm, however other diameter honeycombs (e.g., 10 cm and 25 cm) resulted in the same axial compression properties, and the preload compressive stress in honeycomb substrate at 25° C. Also shown are materials and properties for the metal outer housing (Metal-1) and metal inner housing (Metal-2) including metal thicknesses, lengths, CTE for each, Young's Modulus for each and Poisson Ratio for each.

TABLE 1

| Example | Honeycomb substrate material | Metal-1 housing material | Metal-2 sleeve material | Cells/in² | Web thickness, mils | Metal-1 thickness, mm | Metal-2 thickness, mm |
|---|---|---|---|---|---|---|---|
| 1 | cordierite | 409 Stainless Steel | 304 Stainless Steel | 300 | 12 | 1.3 | 0.8 |
| 2 | cordierite | 409 Stainless Steel | 304 Stainless Steel | 300 | 12 | 1.3 | 0.8 |
| 3 | cordierite | 409 Stainless Steel | 304 Stainless Steel | 300 | 12 | 1.3 | 0.8 |
| 4 | cordierite | 409 Stainless Steel | 304 Stainless Steel | 300 | 12 | 1.3 | 0.8 |
| 5 | cordierite | 430 Stainless Steel | 304 Stainless Steel | 300 | 12 | 1.3 | 0.8 |
| 6 | cordierite | Alloy 42 Class 5 | 304 Stainless Steel | 300 | 12 | 1.3 | 0.8 |
| 7 | cordierite | Kovar ® Fe—Ni—Co alloy | 304 Stainless Steel | 300 | 12 | 1.3 | 0.8 |
| 8 | cordierite | 430 Stainless Steel | 310 Stainless Steel | 300 | 12 | 1.3 | 0.8 |
| 9 | cordierite | 430 Stainless Steel | 316 Stainless Steel | 300 | 12 | 1.3 | 0.8 |
| 10 | cordierite | 409 Stainless Steel | 304 Stainless Steel | 300 | 12 | 1.3 | 0.8 |
| 11 | cordierite | 409 Stainless Steel | 304 Stainless Steel | 600 | 3 | 1.3 | 0.8 |
| 12 | AT | 409 Stainless Steel | 304 Stainless Steel | 300 | 8 | 1.3 | 0.8 |
| 13 | AT | 409 Stainless Steel | 304 Stainless Steel | 300 | 8 | 1.3 | 0.8 |
| 14 | AT | 430 Stainless Steel | 304 Stainless Steel | 300 | 8 | 1.3 | 0.8 |
| 15 | SiC | 409 Stainless Steel | 304 Stainless Steel | 300 | 12 | 1.3 | 0.8 |

TABLE 1-continued

| | | | | | | | |
|---|---|---|---|---|---|---|---|
| 16 | SiC | 409 Stainless Steel | 304 Stainless Steel | 300 | 12 | 1.3 | 0.8 |

| Example | Honeycomb substrate length, cm | Metal-1 total length, cm | Metal-2 length, cm | CTE_honeycomb (alpha_c), cm/cm/° C. | CTE_metal-1 (alpha-1_m), cm/cm/° C. | CTE_metal-2 (alpha-2_m), cm/cm/° C. |
|---|---|---|---|---|---|---|
| 1 | 10.5 | 30 | 19.5 | 8.0E−07 | 1.2E−05 | 1.8E−05 |
| 2 | 10.5 | 30 | 19.5 | 8.0E−07 | 1.2E−05 | 1.8E−05 |
| 3 | 10.5 | 30 | 19.5 | 8.0E−07 | 1.2E−05 | 1.8E−05 |
| 4 | 10.5 | 30 | 19.5 | 8.0E−07 | 1.2E−05 | 1.8E−05 |
| 5 | 14.1 | 30 | 15.9 | 8.0E−07 | 9.9E−06 | 1.8E−05 |
| 6 | 17.4 | 30 | 12.6 | 8.0E−07 | 8.0E−06 | 1.8E−05 |
| 7 | 20.9 | 30 | 9.1 | 8.0E−07 | 6.0E−06 | 1.8E−05 |
| 8 | 9.1 | 30 | 20.9 | 8.0E−07 | 1.0E−05 | 1.4E−05 |
| 9 | 11.8 | 30 | 18.2 | 8.0E−07 | 1.0E−05 | 1.6E−05 |
| 10 | 20.9 | 60 | 39.1 | 8.0E−07 | 1.2E−05 | 1.8E−05 |
| 11 | 10.2 | 30 | 19.8 | 3.0E−07 | 1.2E−05 | 1.8E−05 |
| 12 | 10.3 | 30 | 19.7 | 5.0E−07 | 1.2E−05 | 1.8E−05 |
| 13 | 10.3 | 30 | 19.7 | 5.0E−07 | 1.2E−05 | 1.8E−05 |
| 14 | 13.7 | 30 | 16.3 | 5.0E−07 | 1.0E−05 | 1.8E−05 |
| 15 | 12.9 | 30 | 17.1 | 4.0E−06 | 1.2E−05 | 1.8E−05 |
| 16 | 12.9 | 30 | 17.1 | 4.0E−06 | 1.2E−05 | 1.8E−05 |

| Example | Young's Modulus of Metal-1 housing (MPa) | Poisson Ratio of Metal-1 housing | Young's Modulus of Metal-2 housing (MPa) | Poisson Ratio of Metal-2 housing | Young's Modulus of honeycomb substrate (MPa) | Poisson Ratio of honeycomb substrate | preload compressive stress in honeycomb substrate at 25° C., (MPa) |
|---|---|---|---|---|---|---|---|
| 1 | 2.0E+05 | 0.31 | 2.0E+05 | 0.31 | 2.8E+03 | 0.3 | 0.0 |
| 2 | 2.0E+05 | 0.31 | 2.0E+05 | 0.31 | 2.8E+03 | 0.3 | 0.4 |
| 3 | 2.0E+05 | 0.31 | 2.0E+05 | 0.31 | 2.8E+03 | 0.3 | 3.8 |
| 4 | 2.0E+05 | 0.31 | 2.0E+05 | 0.31 | 2.8E+03 | 0.3 | 7.6 |
| 5 | 2.0E+05 | 0.31 | 2.0E+05 | 0.31 | 2.8E+03 | 0.3 | 0.0 |
| 6 | 2.0E+05 | 0.31 | 2.0E+05 | 0.31 | 2.8E+03 | 0.3 | 0.0 |
| 7 | 2.0E+05 | 0.31 | 2.0E+05 | 0.31 | 2.8E+03 | 0.3 | 0.0 |
| 8 | 2.0E+05 | 0.31 | 2.0E+05 | 0.31 | 2.8E+03 | 0.3 | 0.0 |
| 9 | 2.0E+05 | 0.31 | 2.0E+05 | 0.31 | 2.8E+03 | 0.3 | 0.0 |
| 10 | 2.0E+05 | 0.31 | 2.0E+05 | 0.31 | 2.8E+03 | 0.3 | 0.0 |
| 11 | 2.0E+05 | 0.31 | 2.0E+05 | 0.31 | 2.8E+03 | 0.3 | 0.0 |
| 12 | 2.0E+05 | 0.31 | 2.0E+05 | 0.31 | 1.5E+03 | 0.3 | 0.0 |
| 13 | 2.0E+05 | 0.31 | 2.0E+05 | 0.31 | 1.5E+03 | 0.3 | 2.1 |
| 14 | 2.0E+05 | 0.31 | 2.0E+05 | 0.31 | 1.5E+03 | 0.3 | 1.6 |
| 15 | 2.0E+05 | 0.31 | 2.0E+05 | 0.31 | 6.0E+03 | 0.3 | 0.0 |
| 16 | 2.0E+05 | 0.31 | 2.0E+05 | 0.31 | 6.0E+03 | 0.3 | 6.7 |

The results from these examples shows for these combinations of lengths and coefficients of thermal expansions for honeycomb body 200, outer wall 220 (Metal-1) and inner member 224 (Metal-2) results in the honeycomb body 200 remaining in axial contact with inner member 224 (Metal-2) over a temperature ranging from −40° C. to at least 800° C. The contact between the honeycomb body 200 and inner member 224 ensures that the honeycomb body 200 does not move during thermal cycling and thus is suitable as a mounting method and article to hold the honeycomb in place over a broad temperature range. In some of these exemplary embodiments, the honeycomb body is in axial compression thus further keeping it from moving over a broad temperature range. In some of these exemplary embodiments, the honeycomb body is in axial compression having contribution from both thermal compressive stress and external applied compressive load. In some of these exemplary embodiments, the length of honeycomb body 200 is between about 10 cm and about 40 cm. In some other embodiments, the length of the inner member 224 is between about 10 cm and about 80 cm. In some of these exemplary embodiments, the difference in the coefficient of thermal expansion between inner member 224 and outer wall 220 is between about 3×10⁻⁶ cm/cm/° C. and about 1.5×10⁻⁵ cm/cm/° C. In some other embodiments, the difference in the coefficient of thermal expansion between inner member 224 and outer wall 220 is between about 4×10⁻⁶ cm/cm/° C. and about 1.2×10⁻⁵ cm/cm/° C.

In accordance with some of the exemplary embodiments, a manufactured sample was prepared as follows. A sample having a 409 SS can outer wall and 316 SS inner rods inner member pressed against a cordierite honeycomb substrate at room temperature (RT) of about 25° C. and welded to the can. The canned honeycomb sample was placed in a furnace, heated from room temperature of about 25° C. to about 800° C. The honeycomb was measured for gap and movement using an Instron® machine relative to the axial position of the can and rods. The honeycomb was found to have no axial gap or movement relative to the can and rods over this temperature range, thus demonstrating this new mounting method.

Figure 6:
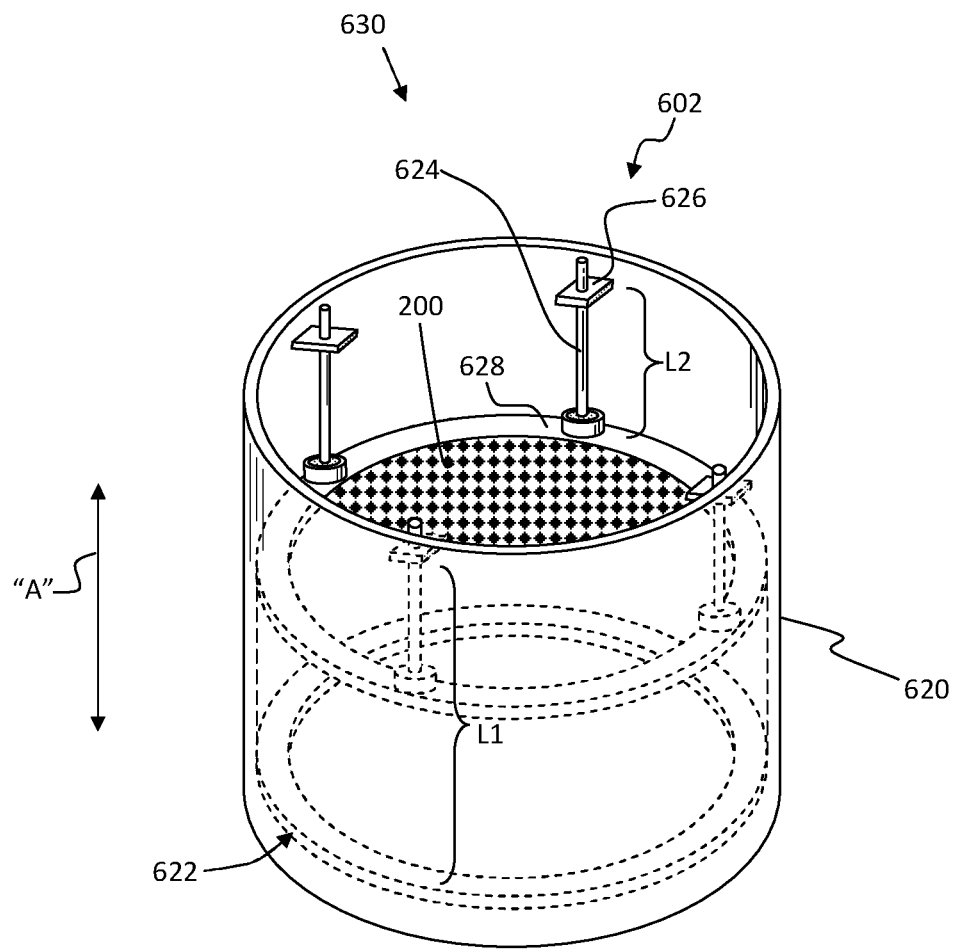
FIG. 6 presents a schematic perspective view of a housing having inner and outer components of differential CTE and a honeycomb body disposed therein forming an exhaust gas treatment article according to another exemplary embodiment of the disclosure.

FIG. 6 presents a schematic perspective view of a housing having inner and outer components of differential CTE and a honeycomb body disposed therein forming an exhaust gas treatment article according to these exemplary embodiments of the disclosure. The exemplary embodiment shown in FIG. 6 is similar to the exemplary embodiment described above with reference to FIG. 2, but with rods 624 illustrated as the inner member and a ring at the inner member contact end 628.

An initial compressive stress can be applied to the honeycomb body when the honeycomb body 200 is mounted between the contact end 628 and the anchor 622. According to these exemplary embodiments, the outer wall 620 has a first CTE of $\alpha_1$ and the inner member (rods) 624 have a second CTE of $\alpha_2$ greater than $\alpha_1$ and connected to the outer wall 620 at a housing connection 626 spaced apart from the anchor 622 by an axial distance L1. The inner member 624 is configured to extend axially from the housing connection 626 to the first face of the honeycomb body 200 when the second face is contacted by the anchor 622, for example, as shown in FIG. 6. The contact end 628 of the inner member 624 is configured to contact the first face, for example, in the form of a ring as illustrated. The inner member 624 extends axially from the housing connection 626 to the first face of the honeycomb body 200 a distance L2. The rods defining the inner member 624 in this exemplary embodiment are each connected to the outer wall 620 only at respective housing connections 626 spaced a distance L2 from the contact end 628 configured to contact the first face of the honeycomb body 200. For example, in one embodiment the lengths $L_1$ and $L_2$ are chosen such that $L1 \times \alpha_1$ is less than or equal to $L2 \times \alpha_2$.

In FIG. 6, exhaust gas may heat the inner rods 624 and outer wall 620 of the housing 602 causing the inner rods 624 to expand more than the outer wall 620 per unit length. The inner rods 624 will exert a force to the first end face of the honeycomb body 200 via contact end ring 628 along the axial direction and the anchor 622 will exert an opposing force at the second end face of the honeycomb body 200 resulting in an additional compressive force on honeycomb body 200 at all temperatures.

Thus, the housing 602 is configured to firmly secure (mount) the honeycomb body 200 between the anchor 622 and the inner member contact end 628. The housing 602 having the honeycomb body 200 mounted therein as disclosed may form an exhaust gas treatment article 630, or other fluid stream treatment article 630.

According to exemplary embodiments of this disclosure, a low cost low expansion housing, exhaust gas treatment article including the housing, an exhaust system including the exhaust gas treatment article, and a canning method to produce the same is provided. In some embodiments, the housing, exhaust gas treatment article, system, and canning method to produce the same eliminates or minimizes the need for mats. Moreover, the housing and exhaust gas treatment article avoid potential problems of the mat decomposing and fibers from the mat plugging downstream parts of an emission (exhaust) system. The housing and exhaust gas treatment article also provide a solution to the canning problem with intumescent mats, where the intumescent mat is not able to provide radial compression to the honeycomb body if the mat temperature is low during use thereof.

Another advantage of the low cost exhaust gas treatment article and canning method to produce the same according to exemplary embodiments of the disclosure is providing heat shielding of the honeycomb body from the housing achieved by blocking outer cells of the honeycomb body via one or more of the anchor and at least one inner member contact end at the outer area of the honeycomb and/or achieved by a gap between the honeycomb body outer wall and the inner surface of the housing outer wall.

It will be apparent to those skilled in the art that various modifications and variations can be made in the present disclosure without departing from the spirit or scope of the disclosure. Thus, it is intended that the appended claims cover the modifications and variations of this disclosure provided they come within the scope of the appended claims and their equivalents.

The invention claimed is:

1. A fluid stream treatment article, comprising:
a honeycomb body comprising a porous ceramic and having a plurality of channel walls extending axially between opposing first and second end faces and defining cell channels therebetween, and comprising an outer peripheral surface extending axially; and
a housing configured to mount the porous ceramic honeycomb body, comprising:
an outer wall having a first coefficient of thermal expansion (CTE), $\alpha1$, disposed around the honeycomb body outer peripheral surface, the outer wall comprising an inner surface that defines an inner space containing the honeycomb body,
at least one first inner member connected to the outer wall and extending axially in the inner space of the outer wall to the first end face of the honeycomb body, and
at least one second inner member disposed on the outer wall in the inner space of the outer wall,
wherein the at least one first inner member has a second CTE, $\alpha2$, greater than the first CTE, the at least one inner member configured to expand more than the outer wall per unit length when the housing is heated to hold the honeycomb body between the at least one first inner member and the at least one second inner member disposed at the second end face at all temperatures in an operating temperature range, and
wherein the at least one second inner member is connected to the outer wall and extends axially to the second end face of the honeycomb body, wherein the at least one second inner member has a third CTE, $\alpha22$, greater than the first CTE.

2. The article of claim 1, wherein the at least one first inner member and the at least one second inner member maintain contact with the first end face and second end face at all temperatures in the operating temperature range.

3. The article of claim 1, wherein the honeycomb body is axially compressively held between the at least one first inner member and the at least one second inner member at all temperatures in the operating temperature range.

4. The article of claim 1, wherein the at least one inner member is spaced apart from the first end face of the honeycomb body by an axial gap $\delta$, and wherein $0<\delta\leq$ about 500 microns.

5. The article of claim 4, wherein $0<\delta\leq$ about 100 microns.

6. The article of claim 1,
wherein the at least one second inner member is an anchor to support the honeycomb body at the second end face, and
wherein the first inner member connection to the outer wall is spaced apart axially from the anchor connection to the outer wall by a distance L1 and the first inner member connection to the outer wall is spaced apart axially from the honeycomb body first face by a distance L2 such that $L1 \times \alpha1 = L2 \times \alpha2$.

7. The article of claim 1,
wherein the at least one second inner member is an anchor to support the honeycomb body at the second end face, and
wherein the first inner member connection to the outer wall is spaced apart axially from the anchor connection to the outer wall by a distance L1 and the first inner member connection to the outer wall is spaced apart axially from the honeycomb body first face by a distance L2 such that the L2≥L1(α1−αs)/(α2−αs), and wherein αs is the coefficient of thermal expansion (CTE) of the honeycomb body.

8. The article of claim 1, wherein the at least one second inner member is an anchor to support the honeycomb body at the second end face, and, wherein the first inner member connection to the outer wall is spaced apart axially from the anchor connection to the outer wall by a distance L1 and the first inner member connection to the outer wall is spaced apart axially from the honeycomb body first face by a distance L2 such that the length Ls of the honeycomb body is Ls≤L1(α2−α1)/(α2−αs), and wherein αs is the coefficient of thermal expansion (CTE) of the honeycomb body.

9. The article of claim 1, wherein the at least one first inner member is one inner member, the outer wall and the first inner member comprise tube shapes, and the second inner member comprises a ring around the inner surface of the outer wall to support the honeycomb body at the second end face.

10. The article of claim 1, wherein at least one of the at least one first inner member and the second inner member are configured to block flow to cell channels around a periphery portion of the honeycomb body to insulate the bulk of the honeycomb body channels inward of the periphery portion from thermal transfer to the outer wall.

11. The article of claim 1, wherein at least a portion of each at least one first inner member extends along at least a portion of the outer peripheral surface of the honeycomb to a recessed portion of the first end face.

12. The article of claim 11, wherein at least a portion of each at least one second inner member extends along at least a portion of the outer peripheral surface of the honeycomb to a recessed portion of the second end face.

13. The article of claim 1, wherein the outer wall is spaced apart from the honeycomb body outer peripheral surface by a gap.

14. The article of claim 1, wherein α2 is in a range of about 150×10−7 cm/cm/° C. to about 200×10−7 cm/cm/° C.

15. The article of claim 1, wherein the first inner member connection to the outer wall is spaced apart axially from the second inner member connection to the outer wall by a distance L1, the first inner member connection to the outer wall spaced apart axially from the honeycomb body first face by a distance L21, and the second inner member connection to the outer wall spaced apart axially from the honeycomb body second face by a distance L22, such that L1×α1=L21×α2+L22×α22.

16. An article for treating a fluid stream, comprising:

a honeycomb body comprising a porous ceramic and having a plurality of channel walls extending axially between opposing first and second end faces and defining cell channels therebetween, and comprising an outer peripheral surface extending axially; and a housing in which the porous ceramic honeycomb body is mounted, comprising:

an outer wall having a first coefficient of thermal expansion (CTE), α1, surrounding the honeycomb body, and first and second inner members disposed on an inner surface of the outer wall and extending radially inward, the first inner member having a second CTE, α2, greater than the first CTE, the first inner member extending axially and having a length L2, the second inner member having a third CTE, α22, greater than the first CTE, wherein the first and second inner members maintain contact with the honeycomb body at all temperatures in an operating temperature range.

17. The article of claim 16, wherein the outer wall has an axial length L1 between the first and second inner members disposed thereon, and a first product, L1×α1, is substantially similar to a second product, L2×α2.

18. The article of claim 16, wherein the first and second inner members compressively hold the honeycomb body.

19. A housing configured to mount a porous ceramic honeycomb body, comprising:

an outer wall having a first coefficient of thermal expansion (CTE), α1, configured to be disposed around the honeycomb body outer peripheral surface to define an inner space containing the honeycomb body, at least one first inner member connected to the outer wall and extending axially in the inner space of the outer wall configured to contact a first end face of the honeycomb body, and at least one second inner member disposed on the outer wall in the inner space of the outer wall configured to contact a second end face of the honeycomb body, wherein the at least one first inner member has a second CTE, α2, greater than the first CTE, the second inner member has a third CTE, α22, greater than the first CTE, the at least one first inner member configured to expand more than the outer wall per unit length when the housing is heated to hold the honeycomb body between the at least one first inner member and the at least one second inner member at all temperatures in an operating temperature range.

* * * * *